COLOR KINESCOPE OPERATING AND TESTING ARRANGEMENTS

Filed Jan. 15, 1963

INVENTORS
PAUL E. CROOKSHANKS &
GORDON E. KELLY
BY W. H. Sprangle
Attorney

United States Patent Office 3,270,125

Patented August 30, 1966

3,270,125
COLOR KINESCOPE OPERATING AND TESTING ARRANGEMENTS

Gordon E. Kelly and Paul E. Crookshanks, Indianapolis, Ind., assignors to Radio Corporation of America, a corporation of Delaware Filed Jan. 15, 1963, Ser. No. 251,644
3 Claims. (Cl. 178—5.4)

The present invention relates generally to color television, and particularly to apparatus associated with a color kinescope so as to establish proper operating bias and drive conditions for said color kinescope, and to facilitate testing whereby such conditions may be optimized.

The tri-gun, shadow-mask color kinescope is widely used as the color display device in color television receivers. It is customary to supply both the cathodes and the control grids of the multiple electron guns of this device with different signal components contributing to the desired color image reproduction. A luminance signal is usually applied to the respective cathodes to control the brightness of the elements of the displayed picture. A respectively appropriate color-difference signal is applied to each control grid to control the hue and saturation of the coloring associated with the elements of the displayed picture. Inclusion of the proper D.C. component in the respective luminance and color difference signals as applied to the kinescope electrodes is requisite if accurate reproductions are to be achieved. D.C. stability is thus an important consideration in the circuitry employed in driving the kinescope with these signals.

The multi-gun character of the tri-gun shadow-mask color kinescope imposes a requirement of accurately matching gun characteristics. While care is taken in the manufacture of these kinescopes to achieve a considerable degree of matching between the operating characteristics of the respective electron guns, there are inevitable residual differences between the guns within a given kinescope, and between the guns of such kinescope, and the guns of any other kinescope to be used as its replacement.

In view of the foregoing conditions, it is desirable to incorporate, in a color television receiver employing a tri-gun shadow-mask color kinescope, circuitry enabling the establishment of proper operating bias and drive conditions, taking into account the gun characteristic differences likely to be encountered. The circuitry should be capable of supplying the kinescope with signals having the proper D.C. content, and with assurances of D.C. stability so as to maintain such proper content. It is also desirable that such circuitry facilitate the testing of the color kinescope and its biasing and drive conditions so that these conditions may be optimized.

The present invention provides color kinescope biasing and driving circuitry with the above described attributes in a manner achieving circuit economy. In accordance with an embodiment of the present invention, luminance signals, with their D.C. component retained, are applied to the respective cathodes of the color kinescope via means permitting adjustment of the magnitude of signal drive to a selectable two of the three cathodes. Each of the three control grids is supplied with a different color difference signal from the receiver's color matrix by an individual signal path providing 100% D.C. coupling, and assuring D.C. stability.

Each of the three screen grids of the color kinescope is supplied with an individually adjustable energizing D.C. potential; the appropriate adjustments of these potentials permit matching of the cut-off characteristics of the respective kinescope guns under most circumstances. However, as a further aid to achievement of such cut-off matching, a master bias control is additionally provided which permits a common adjustment of the D.C. biasing potentials on the kinescope cathodes. Where gun differences are such that, initially, manipulation of the screen grid potentials within their ranges of adjustment does not achieve the desired cut-off matching, the master bias control provides means for commonly adjusting the control grid-cathode biases (as well as the screen grid-cathode biases) to a new set of operating points at which the screen grid potential adjustments can achieve the desired cut-off matching.

The described embodiment of the present invention permits achievement of proper set-up of the receiver's color kinescope in an expeditious manner, using an economical circuit arrangement which permits accurate D.C. component application with assurances of D.C. stability.

An object of the present invention is to provide new and improved apparatus for establishing proper operating bias and drive conditions for a color kinescope, and for facilitating testing of such conditions.

A further object of the present invention is to provide apparatus for adjusting drive and bias parameters associated with the operation of a color image reproducer in a manner ensuring the delivery of signals to the reproducer with the D.C. content thereof maintained with accuracy and stability.

Other objects and advantages of the present invention will be readily apparent to those skilled in the art upon a reading of the following detailed description and an examination of the accompanying drawing in which.

Figures 1, 2:
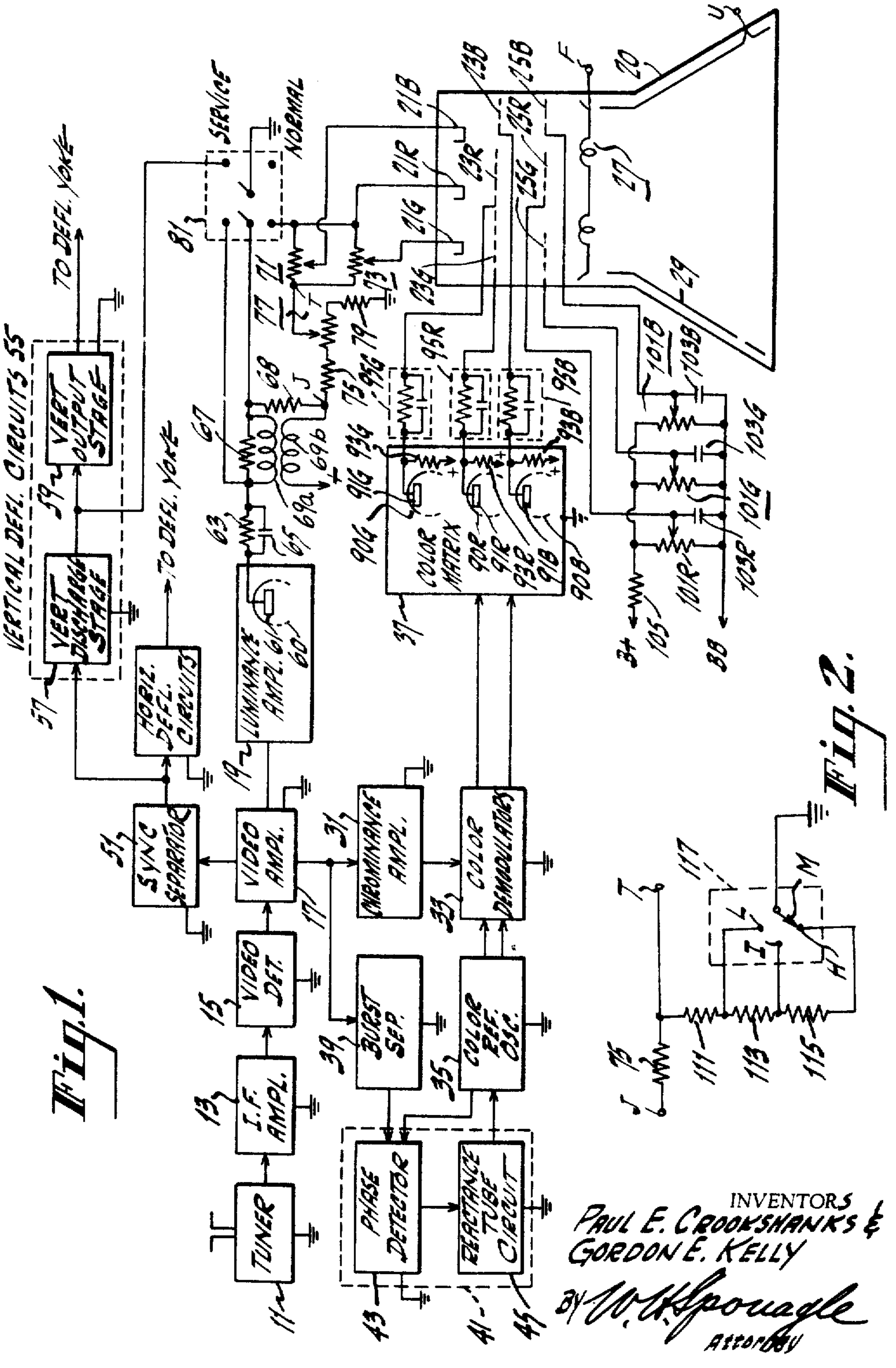
FIGURE 1 shows a color television receiver, partially schematically and partially in block diagram form, which receiver incorporates an embodiment of the present invention.
FIGURE 2 illustrates schematically a modification of the invention embodiment of FIGURE 1.

A color television receiver is illustrated in FIGURE 1 of the drawing with an array of blocks representing a number of conventional color receiver elements. The general arrangement of the illustrated color receiver is similar to the arrangement of the RCA CTC–11 color television receiver chassis described in the RCA Service Data pamphlet designated 1962 No. T7.

Thus, a tuner 11 is provided for converting received broadcast signals to intermediate frequencies. The intermediate frequency signal output of tuner 11 is amplified in an intermediate frequency amplifier 13 and then supplied to a video detector 15 which develops therefrom a composite color video signal output.

The composite color video signal output of detector 15 includes a deflection synchronizing component, a video signal component representative of luminance information, a color synchronizing component, and a chrominance component which appears in the form of a modulated color subcarrier. The composite signal from video detector 15 is applied to a video amplifier 17 which supplies an amplified version thereof to a number of different utilization channels. One output of video amplifier 17 is supplied to a sync separator 51, which separates the deflection synchronizing component from the remainder of the composite signal, and applies the deflection synchronizing signals to respective horizontal and vertical deflection circuits 53 and 55 in order to synchronize raster development in the receiver's reproducing device. Where the reproducing device is a tri-gun, shadow-mask color kinescope, as is the schematically illustrated reproducer 20 in FIGURE 1 of the drawing, the outputs of the respective deflection circuits are supplied in a known manner to the appropriate windings of a deflection yoke surrounding the beam paths of the color kinescope. To simplify the drawing, the deflection yoke has not been illustrated.

Another output of video amplifier 17 is supplied to the chrominance amplifier 31, which takes the form of a bandpass amplifier. The passband associated with amplifier 31 encompasses the frequencies of the color subcarrier and its sidebands. The chrominance amplifier 31 amplifies the chrominance component of the received composite signal to the exclusion of the low frequency portion of the luminance component thereof. The output of chrominance amplifier 31 is conveyed to color demodulators 33, which serve to synchronously detect the modulated color subcarrier to recover a pair of color-difference signals therefrom. These color-difference signals are supplied to a color matrix 37, wherein they are combined appropriately to produce a set of three color-difference signals, of the form R–Y, G–Y and B–Y, for delivery to the control grids (23R, 23G and 23B) of the respective red, green and blue electron guns of the color kinescope 20.

The video amplifier 17 output is also supplied to a burst separator 39, which is suitably keyed (by keying pulses derived from the horizontal deflection circuits 53) to selectively amplify the color synchronizing component of the received composite signal. The color synchronizing component comprises a burst of oscillations of color subcarrier frequency and of reference phase. The burst output of separator 39 is compared in phase with the output of a color reference oscillator 35 in a phase detector 43. The output of phase detector 43 controls a reactance tube circuit 45, which is associated with the reference oscillator 35 in a conventional frequency controlling manner. Phase detector 43 and reactance tube circuit 45 effectively form a color synchronization arrangement 41 or assuring frequency and phase sychronized operation of the receiver's color reference oscillator 35. As those skilled in the art will appreciate, the color synchronizing unit 41 may, alternatively, take other well known forms. Suitably phased outputs of the synchronized color reference oscillator 35 are applied to the color demodulators 33 to effect the desired synchronous detection of the modulated color subcarrier.

Video amplifier 17 additionally supplies a signal to a luminance amplifier 19, which is provided to deliver an amplified luminance component, with its D.C. component intact, to the cathodes of the color kinescope 20.

As noted previously, the general color receiver arrangement described above is similar to the arrangement of the RCA CTC–11 color television chassis. To appreciate the operation and advantages of the present invention, it is now in order to consider in detail the circuits associated with the delivery of signals from luminance amplifier 19 and color matrix 37 to the color kinescope 20, and the biasing circuits associated with the kinescope electrodes.

The schematic details of luminance amplifier 19 have not been shown in the drawing, other than the indication of the incorporation of a tube 60 therein and the showing of a plate electrode 61 for the tube 60, from which plate the amplifier 19 output connection is made. It is immaterial for purposes of description of the present invention whether the amplifier 19 has one or more amplifier stages. However, for proper operation of the kinescope 20, the output signal appearing at plate 61 should be of such polarity that the synchronizing pulses are positive-going.

The plate 61 of the luminance amplifier tube 60 is connected to the positive terminal of the receiver's B+ supply (not illustrated) by a path which includes a parallel RC network 63–65; a series peaking coil 69A, shunted by a resistor 67; a video load resistor 68; and a shunt peaking coil 69B. The video peaking effect of coils 69A and 69B is enhanced by providing mutual inductive coupling therebetween.

When a service facilitating switch 81, to be described in detail subsequently, is in its normal operating position, the junction between series peaking coil 69A and video load resistor 68 is directly connected to the cathode 21R of the red electron gun of kinescope 20. The luminance signal output of amplifier 19, developed across load resistor 68, is thus applied in unattenuated form by this direct connection to the red gun cathode. An adjustably attenuated version of the luminance signal output across load resistor 68 is supplied to the blue gun cathode 21B via a blue drive adjusting potentiometer 71; similarly, a separately adjustably attenuated version of the luminance signal output is supplied to the green gun cathode 21G via a green drive adjusting potentiometer 73. The adjustable tap of each drive adjusting potentiometer is connected to the respectively associated cathode. One fixed terminal of each drive adjusting potentiometer is connected to the red gun cathode 21R; the other fixed terminal of each drive adjusting potentiometer is connected via common terminal T to the adjustable tap of a common bias adjusting potentiometer 77.

The resistive element of the bias adjusting potentiometer 77 is associated with range limiting resistors 75 and 79 to form a voltage divider across the receiver's B+ supply. Accordingly, one fixed terminal of the potentiometer 77 is connected via resistor 75 to the junction J of shunt peaking coil 69B and load resistor 68; the other fixed terminal of potentiometer 77 is connected via resistor 79 to the negative terminal of the B+ supply, e.g., chassis ground.

The service facilitating switch 81 comprises a conventional double-pole, double-throw switch. In the "normal" position of the switch, one blade of the switch serves to complete the connection between the coil 69A-resistor 68 junction and the red gun cathode 21R. In the alternate "service" position, this blade disrupts this connection and returns the noted junction point directly to the opposite end of coil 69A. The other blade of the double-pole, double-throw switch 81 is utilized to disable the vertical deflection circuits 55 when the switch is thrown to the "service" position. The vertical deflection circuits 55 include a vertical discharge stage 57, which operates in response to the deflection sync output of sync separator 51 to produce a synchronized vertical deflection waveform at an output terminal V; the waveforms appearing at terminal V are a vertical output stage 59. In the "service" position of switch 81, the discharge stage output terminal V is directly grounded, whereby no input signal is supplied to the vertical output stage 59 for energization of the vertical windings of the kinescope deflection yoke. In the "normal" position of switch 81, this shorting of terminal V to ground is removed.

As in the case of the luminance amplifier 19, the full details of the color matrix apparatus 37 have not been illustrated in FIGURE 1 of the drawing; this apparatus may, for example, take the form of the matrix amplifier circuitry of the previously mentioned RCA CTC–11 color receiver chassis. A fragmentary showing of the output circuitry of the color matrix 37 has been made in FIGURE 1 by indications of the provision of three amplifier tubes 90G, 90R and 90B, the showing of the anode electrodes thereof (91G, 91R and 91B respectively), and by the showing of respective anode load resistors 93G, 93R and 93B, each connecting the associated anode to a source of positive D.C. potential. A direct current conductive connection is provided between each matrix amplifier anode and the control grid of the respectively associated kinescope gun. While for signal purposes this connection could readily be a simple wire connection, the apparatus of the present invention provides for the incorporation in each such direct current conductive connection of a network comprising a resistor shunted by a capacitor; the respective networks associated with driving the ground, red and blue gun grids are designated on the drawing by the numerals 95G, 95R and 95B. The resistance value of the resistor in each of these networks is chosen to be quite large relative to the resistance value of the respectively associated anode load resistor. The networks 95G, 95R and 95B serve a kinescope protection function, as well as facilitating use of an expeditious kinescope servicing technique, as will be described in greater detail subsequently.

Each of the respective screen grids (or first anodes)

25G, 25R and 25B of the color kinescope 20 is supplied with an individually adjustable energizing potential. The green screen grid 25G, for example is connected to the adjustable tap of a green screen bias adjusting potentiometer 101G. The fixed terminals of potentiometer 101G are connected to points of respectively different positive D.C. potentials. In the illustrated arrangement, one fixed terminal of the potentiometer 101G is connected to a point of so-called B-boost potential BB, an augmented B+ potential available from the horizontal deflection circuits 53 in the usual receiver arrangement. The other fixed terminal of potentiometer 101G is connected to a point of B+ potential through a dropping resistor 105. The adjustable tap of potentiometer 101G is bypassed to the B-boost terminal through the use of bypass capacitor 103G. The described arrangement for the potentiometer 101G is representative of analogous arrangements for the red screen bias adjusting potentiometer 101R and the blue screen bias adjusting potentiometer 101B.

The focus electrode structure 27 of the color kinescope 20 is connected to a terminal F, and the color kinescope's ultor (final accelerating) electrode 29 is connected to a terminal U. The terminals F and U receive respectively appropriate D.C. energizing potentials from the receiver's high voltage supply (not illustrated), which may be associated in the conventional manner with the horizontal deflection circuits 53.

To briefly describe the manner in which the elements described above are usefully employed in the color receiver, it will first be assumed that switch 81 has been thrown to the "service" position and it is desired to properly "set up" the color kinescope 20 for viewing operation. As a result of the throwing of the switch 31 to the "service" position, the normal luminance signal drive to the kinescope cathodes is disrupted. Additionally, the vertical deflection of the color kinescope beams is disabled, whereby deflection of the beams can produce only a single horizontal line trace on the kinescope screen.

In the first phase of the kinescope set up procedure it is desired to match the respective gun cut-offs. Accordingly, the screen grid bias adjusting potentiometers 101R, 101G and 101B are turned to their minimum potential settings, whereby no visible trace appears on the kinescope screen. Then, in turn, the bias on each screen is raised until the electron beam of the respectively associated gun just produces a barely visible line trace on the kinescope screen. If this condition can be reached by movement of the potentiometer taps of 101R, 101G and 101B, arrival at the appropriate setting for each is achieved successively, and the taps are then left at these settings with the assurance of achievement of cut-off matching.

However, if the circumstances are such that the adjustment of any one of the potentiometers 101R, 101G and 101B all the way to the maximum potential obtainable still fails to produce a visible trace from the beam of the associated gun, then an adjustment of the common electrode bias potentiometer 77 is called for. Under these circumstances the tap on the "offending" screen potentiometer is left at its maximum potential setting, and the control grid-cathode bias is increased in a conduction enhancing sense by adjustment of the potentiometer 77 setting until a barely visible line trace is produced by the "offending" gun. The adjustments of the remaining screen bias potentiometers are then redone under the new control grid-cathode bias conditions.

When the desired matching of gun cut-offs has been achieved, the switch 81 is then thrown to the "normal" position. Vertical deflection is thereby enabled, and the normal luminance signal driving path is completed. The respective drive potentiometers 71 and 73 are then adjusted, preferably under monochrome reception conditions, until the white highlights of the picture are reproduced as a white of the desired color temperature.

When the foregoing steps are completed, the kinescope bias and drive conditions are then proper for operation of the kinescope in accurately reproducing color images.

In prior art color kinescope biasing arrangements, such as that employed in the previously mentioned RCA CTC-11 color television chassis, a master bias control generally similar in function to the potentiometer 77 of the drawing has been employed in conjunction with the kinescope control grid circuits; such master bias control provided a common adjustment of bias potentials on the respective control grids of the color kinescope. In such prior art arrangements, in order to satisfactorily isolate the matrix amplifier anodes from the effects of master bias control adjustments, isolating resistor circuitry was required which resulted in the voltage division of the D.C. component of the matrix amplifier tube outputs at the color kinescope control grids. Full D.C. coupling from matrix amplifier anode to kinescope control grid was thus not achieved. Also, in order to avoid similar division of the A.C. component of the matrix amplifier output, it was necessary to employ large bypass capacitors in shunt with the isolating resistors. This introduced a problem of possible D.C. instability; i.e., should the large shunt capacitors develop leakage, this would tend to disturb the D.C. level of the signal at the associated kinescope grid.

In the arrangement of the present invention, the drawbacks of a master bias control in the kinescope control grid circuits are avoided. Full D.C. coupling from matrix amplifier anode to kinescope control grid is readily achieved, with D.C. instability substantially precluded. In the simplest form of the present invention, this full D.C. coupling may be achieved by providing a simple wire connection from the anode of each matrix amplifier tube to the respectively associated kinescope control grid. In the embodiment of the invention illustrated in FIGURE 1, however, the simple wire connection is not employed, but rather the D.C. coupling is achieved employing a resistor (of fairly large value, e.g., 100K, relative to the anode load resistor value, e.g., 22K); the coupling resistor is shunted by a capacitor to form a parallel RC network. Under normal conditions, the RC network has substantially no effect on the applied signals.

Each RC coupling network, however, serves the following other functions: (1) It serves to protect the kinescope from grid current damage should the associated matrix amplifier tube fail, substantially restricting grid current to an insignificant magnitude should failure of the matrix amplifier tube result in the tube anode rising to full B+ potential. (2) For certain servicing operations (such as those described on page 22 of the previously mentioned RCA Service Data pamphlet 1961 No. T6), it is desired to be able to selectively cut off one or another of the color kinescope guns in a simple manner not involving an external bias supply. In receivers of the type exemplified by the previously mentioned RCA CTC-11 receiver, such selective cut-off of a color kinescope gun can be simply achieved, for example, by connecting a resistor between the grid of the gun to be killed and chassis ground, the resistor value being chosen to diminish the divided anode potential appearing at the kinescope grid so that the grid is sufficiently negative relative to the kinescope cathode as to effect cut-off. The D.C. coupling resistor of the present arrangement permits use of the above noted servicing technique to selectively cut-off the color kinescope gun. The presence of the coupling resistor ensures that the noted grounding techinque will result in a voltage division of the matrix amplifier anode potential at the kinescope grid, reducing the grid bias to a potential sufficiently negative relative to the kinescope cathode potential so that the gun is cut-off.

In the invention embodiment of FIGURE 1, the master bias potentiometer 77 provides adjustment of kinescope cathode potentials over a restricted range in a substantially continuous manner. FIGURE 2 is illustrative of a modification of the FIGURE 1 circuitry in which a switch arrangement provides a step-type adjustment of the kinescope cathode potentials in lieu of continuous adjustment.

In FIGURE 2, the resistor 75 is connected directly between terminal J (the junction of peaking coil 79B and load resistor 68) and terminal T (the common return terminal of drive adjusting potentiometers 71 and 73). Three voltage dividing resistors 111, 113 and 115 are connected in series between terminal T and contact H of a three-position switch 117. The junction between resistors 113 and 115 is connected to contact I of the switch 117, and the junction between resistors 111 and 113 is connected to contact L of the switch 117.

When the movable switch arm M, which is connected to chassis ground, is positioned so as to ground terminal H, the positive D.C. potential at terminal T is maximum. When the arm M is adjusted so as to ground contact L, the D.C. potential at terminal T is minimum; grounding of contact I provides a D.C. potential at terminal T which is intermediate the maximum and minimum potentials.

A particular set of values for the elements of the circuit arrangement of FIGURE 1, which has provided satisfactory performance, is set forth below. It will be appreciated that these values are given by way of example only:

| | |
|---|---|
| Resistor **63** | 2,700 ohms. |
| Resistor **67** | 18,000 ohms. |
| Resistor **68** | 5,600 ohms. |
| Potentiometer **71** | 5,000 ohms. |
| Potentiometer **73** | 5,000 ohms. |
| Resistor **75** | 5,600 ohms. |
| Potentiometer **77** | 6,000 ohms. |
| Resistor **79** | 22,000 ohms. |
| Resistors **93G, 93R, 93B** (each) | 22,000 ohms. |
| Potentiometers **101R, 101G, 101B**, (each) | 1 megohm. |
| Resistor **105** | 330,000 ohms. |
| RC networks **95G, 95R, 95B** (each) | 100,000 ohms/.01 microfarad. |
| Capacitor **65** | 1,000 micromicrofarads. |
| Capacitors **103R, 103G, 103B** (each) | 1,000 micromicrofarads. |
| Tube **20** | 21FJP22. |
| Tube **60** | 12BY7A. |
| Tubes **90G, 90R, 90B** (each) | 1/2 6FQ7. |

Also given by way of example only are the following values for the circuit modification of FIGURE 2:

| | | |
|---|---|---|
| Resistor **75** | ohms | 6,800 |
| Resistor **111** | do | 22,000 |
| Resistor **113** | do | 15,000 |
| Resistor **115** | do | 47,000 |

What is claimed is:

1. In a color television receiver including a color kinescope having a plurality of electron guns each including cathode, control grid and screen grid electrodes, the combination comprising:

a luminance signal source;

a plurality of respectively different color difference signal sources;

means providing substantially complete direct current coupling between each of said color difference signal sources and a respectively different one of said control grid electrodes;

means for applying an individually adjustable unidirectional potential to each of said screen grid electrodes;

means for coupling said luminance signal source to said cathode electrodes, said last-named coupling means including means for individually adjusting the amplitude of the luminance signal delivered by said coupling means to two of said cathode electrodes;

switching means permitting selective disruption of the luminance signal coupling to said cathode electrodes;

and means independent of said luminance signal source for applying an adjustable unidirectional potential in common to each of said cathode electrodes via said luminance signal amplitude adjusting means in such manner that the magnitude of said unidirectional potential applied to each of said cathode electrodes is substantially independent of the settings of said luminance signal amplitude adjusting means when said luminance signal coupling is selectably disrupted.

2. In a color television receiver including a tri-gun, shadow-mask color kinescope, each gun of said kinescope having cathode, control grid and screen grid electrodes, said receiver further including a luminance signal amplifier having an output terminal at which is developed a luminance signal inclusive of A.C. and D.C. components, and first, second, and third color difference signal amplifiers having respective output terminals at each of which is developed a respectively different color difference signal inclusive of A.C. and D.C. components;

an arrangement for applying signal components and operating biases to said kinescope electrodes which comprises in combination:

means for directly connecting one of said cathode electrodes to said luminance signal amplifier output terminal;

a first drive adjusting potentiometer having an adjustable tap connected to another one of said cathode electrodes, and having a pair of fixed terminals;

a second drive adjusting potentiometer having an adjustable tap connected to the remaining one of said cathode electrodes, and having a pair of fixed terminals;

means for directly connecting one of the fixed terminals of each of said drive adjusting potentiometers to said luminance signal amplifier output terminal;

selectively actuated switching means for disrupting the connections provided to said luminance signal amplifier output terminal by said first-named and said second-named connecting means;

means for applying an adjustable D.C. potential to the remaining fixed terminals of said drive adjusting potentiometers;

means for applying an individually adjustable D.C. potential to each of said screen grid electrodes;

means, including a coupling between each of said color difference signal amplifier output terminals and a respectively different one of said control grid electrodes, for applying both the A.C. and D.C. signal components at each of said last-named output terminals to the respectively associated control grid electrode with substantially equal efficacy.

3. An arrangement in accordance with claim 2 wherein each of said signal component applying means includes means for inhibiting the flow of grid current to the respectively associated control grid electrode.

References Cited by the Examiner

UNITED STATES PATENTS

| | | | |
|---|---|---|---|
| 2,804,496 | 8/1957 | Kirkwood | 178—5.4 |
| 2,839,600 | 6/1958 | Graser | 178—5.4 |
| 2,954,426 | 9/1960 | Kroger | 178—5.4 |
| 3,114,796 | 12/1963 | Stark et al. | 178—5.4 |

OTHER REFERENCES

Fink: Television Engineering Handbook, McGraw-Hill, N.Y., 1957, T.

RCA CTCLLC: Color Television Service Data—File 1961, No. T6, first printing July 15, 1961.

DAVID G. REDINBAUGH, *Primary Examiner.*

ROBERT SEGAL, *Examiner.*

J. A. O'BRIEN, *Assistant Examiner.*